US010734915B2

(12) United States Patent
Huang et al.

(10) Patent No.: US 10,734,915 B2
(45) Date of Patent: Aug. 4, 2020

(54) METHOD FOR SUPPRESSING COMMON-MODE CURRENT OF NEUTRAL LINE IN T-TYPE THREE-LEVEL THREE-PHASE INVERTER

(71) Applicant: GOODWE POWER SUPPLY TECHNOLOGY CO., LTD, Suzhou, Jiangsu (CN)

(72) Inventors: Min Huang, Jiangsu (CN); Yong Yang, Jiangsu (CN); Gang Fang, Jiangsu (CN); Jinjun Lu, Jiangsu (CN); Shengren Xie, Jiangsu (CN)

(73) Assignee: JIANGSU GOODWE POWER SUPPLY TECHNOLOGY CO., LTD. (CN)

( * ) Notice: Subject to any disclaimer, the term of this patent is extended or adjusted under 35 U.S.C. 154(b) by 0 days.

(21) Appl. No.: 16/496,618

(22) PCT Filed: Mar. 23, 2018

(86) PCT No.: PCT/CN2018/080349
§ 371 (c)(1),
(2) Date: Sep. 23, 2019

(87) PCT Pub. No.: WO2018/171766
PCT Pub. Date: Sep. 27, 2018

(65) Prior Publication Data
US 2020/0021204 A1    Jan. 16, 2020

(30) Foreign Application Priority Data
Mar. 24, 2017  (CN) .......................... 2017 1 0180367

(51) Int. Cl.
*H02M 7/5395*    (2006.01)
*H02M 7/487*    (2007.01)
(Continued)

(52) U.S. Cl.
CPC ......... *H02M 7/487* (2013.01); *H02M 7/5395* (2013.01); *H02M 1/12* (2013.01); *H02M 7/483* (2013.01); *H02M 2001/123* (2013.01)

(58) Field of Classification Search
CPC .... H02M 7/487; H02M 7/5395; H02M 7/483; H02M 2001/123; H02M 1/12; H02J 3/383; Y02B 70/1441
See application file for complete search history.

(56) References Cited

U.S. PATENT DOCUMENTS 6,333,569 B1    12/2001  Kim
7,355,865 B2 *   4/2008  Royak .................... H02M 1/12
                                                363/44
(Continued)

FOREIGN PATENT DOCUMENTS

CN    102624266 A    8/2012
CN    102723889 A    10/2012
(Continued)

OTHER PUBLICATIONS

International Search Report dated Jul. 2, 2018 for PCT/CN2018/080349.

Primary Examiner — Yusef A Ahmed
Assistant Examiner — Shahzeb K Ahmad
(74) Attorney, Agent, or Firm — Schmeiser, Olsen & Watts, LLP

(57) ABSTRACT

Provided is a method for suppressing common-mode current of neutral line in T-type three-level three-phase inverter, the method of the present disclosure can effectively suppress LC filter resonance contained in the currents of a circulation neutral line and inversion side of a inverter, reduce the common-mode leakage current of the inverter, and improve the performance of the inverter.

7 Claims, 5 Drawing Sheets

(51) Int. Cl.
   *H02M 1/12* (2006.01)
   *H02M 7/483* (2007.01)

(56) References Cited

U.S. PATENT DOCUMENTS

| | | | |
|---|---|---|---|
| 9,853,573 B2* | 12/2017 | Siri | H02M 7/53871 |
| 10,236,793 B2* | 3/2019 | Lung | G05F 1/67 |
| 2008/0298103 A1 | 12/2008 | Bendre et al. | |
| 2012/0262957 A1* | 10/2012 | Yamada | H02J 3/01 |
| | | | 363/41 |
| 2019/0229646 A1* | 7/2019 | Liu | H02M 7/487 |

FOREIGN PATENT DOCUMENTS

| | | |
|---|---|---|
| CN | 103746584 A | 4/2014 |
| CN | 104811071 A | 7/2015 |
| CN | 105553309 A | 5/2016 |
| CN | 106981976 A | 7/2017 |

* cited by examiner

METHOD FOR SUPPRESSING COMMON-MODE CURRENT OF NEUTRAL LINE IN T-TYPE THREE-LEVEL THREE-PHASE INVERTER

CROSS-REFERENCE TO RELATED APPLICATIONS

This application claims priority to PCT Application No. PCT/CN2018/080349, having a filing date of Mar. 23, 2018, which is based on Chinese Application No. 201710180367.X, having a filing date of Mar. 24, 2017, the entire contents both of which are hereby incorporated by reference.

FIELD OF TECHNOLOGY

The following relates to a method for suppressing a common-mode current of neutral line in T-type three-level three-phase inverter.

BACKGROUND

In a distributed power generation system, the inverter acts as a bridge connecting the renewable energy (such as photovoltaic power generation, wind power generation, etc.) with the power grid or load, and its performance directly affects the entire distributed power generation system. The multi-level inverter in the distributed power generation system has the following advantages compared with the two-level inverter: (1) the inverter output voltage and current harmonics are smaller; (2) the output voltage change rate is smaller; and (3) the output power is larger. Therefore, multi-level inverters have received attention and applications in distributed power generation systems.

In a multi-level inverter, the T-type three-level three-phase inverter has the following advantages compared with a diode-clamped three-level three-phase inverter: (1) reducing six power diodes, thereby reducing system cost; (2) having an inverter switching frequency in 5 kHz-30 kHz, therefore the T-type three-level three-phase inverter is more efficient than the diode-clamped three-level three-phase inverter. Therefore, T-type three-level inverters have been widely used in distributed power generation systems.

In photovoltaic power generation systems, inverters can be divided into isolated and non-isolated inverters, and non-isolated inverters are widely used in distributed photovoltaic power generation systems due to their advantages such as high efficiency and small size. For the non-isolated T-type three-level three-phase photovoltaic grid-connected inverters, in order to reduce the common-mode leakage current of photovoltaic grid-connected inverters, most commercial inverters usually adopt a scheme of connecting the common point of the output filter capacitor of the T-type three-level three-phase inverter to the neutral point (the circulation neutral line) of the DC bus capacitor, as shown in FIG. 1. In this way, a part of the high-frequency current of the inverter will be circulated in the neutral line, which greatly reduces the output common-mode leakage current of the inverter. However, due to the presence of the circulation neutral line of the inverter, the high-frequency component of resonance formed by the LC filter of the T-type three-level three-phase inverter will also flow in the inverter side and the neutral line, affecting the currents in the inversion side and the circulation neutral line of the photovoltaic grid-connected inverter, causing the current of the output inversion side and the circulation neutral line of the photovoltaic grid-connected inverter current to contain the resonant current of the LC filter. Therefore, if uncontrolled, the high-frequency current of the circulation neutral line and the high-frequency component of the current of the inversion side will increase.

For most commercial photovoltaic grid-connected inverters, the resonant current of the LC filter is not considered. The main reason is that the resonant current of the LC filter mainly circulates on the inversion side and the circulation neutral line, and does not flow in the inverter grid side (will not flow into the grid). It can be seen that in order to suppress the high-frequency current of the circulation neutral line in the T-type three-level three-phase grid-connected inverter and the resonant high-frequency current of the inversion side of the inverter, a method for suppressing the current of the circulation neutral line in the T-type three-level three-phase photovoltaic grid-connected inverter to improve the performance of the T-type three-level three-phase photovoltaic grid-connected inverter has a good application prospect in the distributed power generation systems.

SUMMARY

An aspect relates to providing a method for suppressing a common-mode current of neutral line in a T-type three-level three-phase inverter, which can suppress a common-mode current of neutral line in a grid-connected inverter to improve the performance of the inverter.

The method for suppressing a common-mode current of neutral line in a T-type three-level three-phase inverter, is applied to a T-type three-level three-phase inverter adopting SPWM modulation and outputting three-phase current signals $i_a$, $i_b$ and $i_c$ on an inversion side, the output of the T-type three-level three-phase inverter being connected to a power grid via an LC filter, and the method for suppressing a common-mode current of neutral line in a T-type three-level three-phase inverter is: adopting $$\begin{cases} V_{aref}^* = V_{aref} + V_{offset} - V_{offset\_LC} \\ V_{bref}^* = V_{bref} + V_{offset} - V_{offset\_LC} \\ V_{cref}^* = V_{cref} + V_{offset} - V_{offset\_LC} \end{cases}$$

as a modulation signal for modulating the T-type three-level three-phase inverter;

wherein, $V_{aref}^*$, $V_{bref}^*$ and $V_{cref}^*$ are respectively three-phase modulation signals for modulating the T-type three-level three-phase inverter, $V_{aref}$, $V_{bref}$ and $V_{cref}$ are respectively three-phase conventional sine-wave pulse modulation signals, $V_{offset}$ is a third-harmonic bias signal of the three-phase conventional sine-wave pulse modulation signals, $V_{offset\_LC}$ is a voltage bias signal for suppressing a resonant current of the LC filter from being injected to the modulation signal, $V_{offset\_LC} = K_f i_{a\_high}$, $K_f$ is a conversion coefficient for converting current into voltage, and $i_{a\_high}$ is a high-frequency component of an output current $i_a$ of the inversion side of the T-type three-level three-phase inverter.

The output current $i_a$ of the inversion side of the T-type three-level three-phase inverter passes through a low-pass filter to obtain a high-frequency current $i_{a\_low}$ thereof, $i_{a\_high} = i_a - i_{a\_low}$.

$$i_{a\_low} = \frac{\omega_f}{S + \omega_f} i_a,$$

wherein, $\omega_f$ is a cut-off frequency of the low-pass filter, and S is a Laplace transform operator.

$V_{offset\_LC} = -(\max(V_{aref}, V_{bref}, V_{cref}) + \min(V_{aref}, V_{bref}, V_{cref}))/2.$ The three-phase current signals $i_a$, $i_b$ and $i_c$ outputted by the inversion side of the T-type three-level three-phase inverter are respectively converted into corresponding DC components $i_d$ and $i_q$ in the dq coordinate system through coordinate transformation, then the corresponding DC components $i_d$ and $i_q$ of the three-phase current signals are compared with given values $i_d^*$ and $i_q^*$ respectively, and then adjusted outputs through a proportional-integral regulator are output. Three-phase conventional sine-wave pulse modulation signals $V_{aref}$, $V_{bref}$ and $V_{cref}$ are obtained after the adjusted outputs finish the coordinate transformation.

During the coordinate transformation, a spatial angle of the power grid is obtained via a phase locked loop.

The T-type three-level three-phase inverter adopts a vector control mode of grid voltage orientation.

Due to the use of the above technical solutions, the present disclosure has the following advantages over the prior art: The method of the present disclosure can effectively suppress LC filter resonance contained in the currents of a circulation neutral line and the inversion side of the inverter, reduce the common-mode leakage current of the inverter, and improve the performance of the inverter.

BRIEF DESCRIPTION

Some of the embodiments will be described in detail, with references to the following Figures, wherein like designations denote like members, wherein.

DETAILED DESCRIPTION

In the following, the present disclosure is further explained in detail combining with the embodiments shown in the accompanying drawings.

Figure 1:
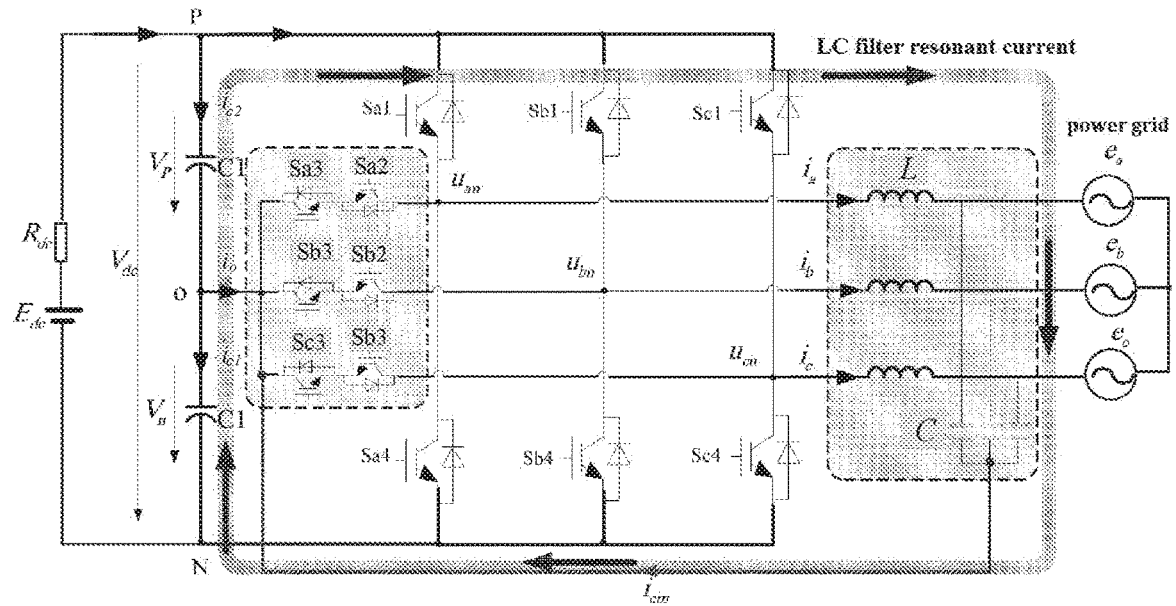
FIG. 1 is a schematic diagram of a resonant current flow loop of an LC filter in a distributed power generation inverter system.
Figure 2:
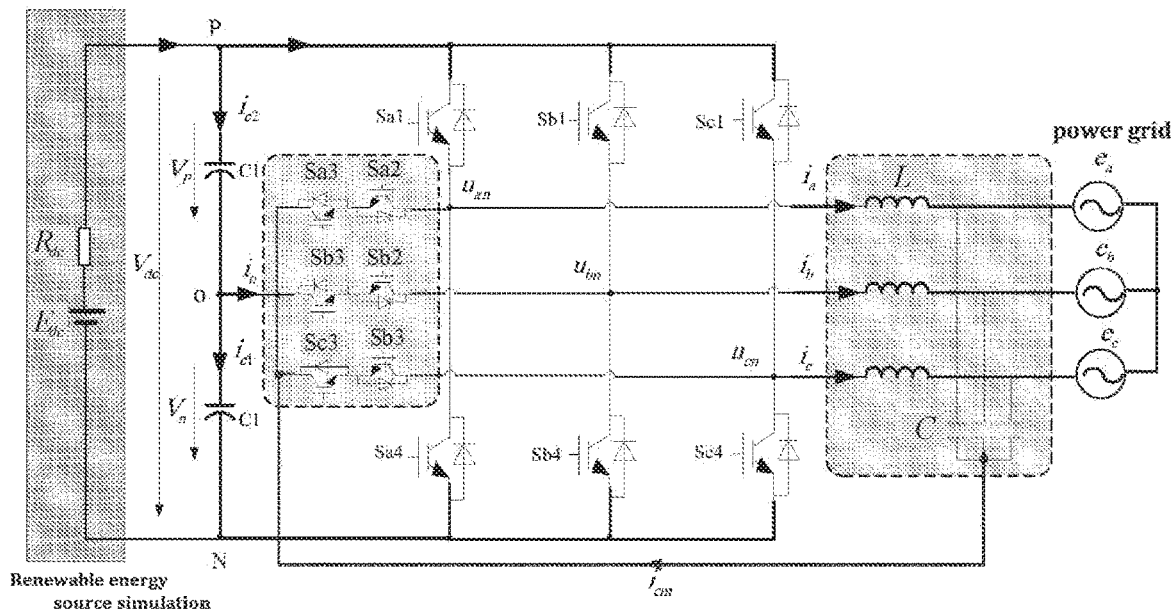
FIG. 2 is a schematic structural diagram of a distributed power generation inverter system.

As shown in FIG. 2, a distributed power generation inverter system consists of distributed renewable energy source, a T-type three-level three-phase inverter, a LC filter, the power grid and the like. In this embodiment, the distributed power generation inverter system is a photovoltaic power generation inverter system, wherein the distributed renewable energy source is a photovoltaic array, which, in FIG. 2, is equivalent to the DC power source $E_{dc}$ and the DC input resistance $R_{dc}$. The T-type three-level three-phase inverter realizes active power and reactive power control according to the input power of the photovoltaic array, and the LC filter filters out the high-frequency component of the inverter output current, and the output of the T-type three-level three-phase inverter is connected to the power grid via the LC filter. In FIG. 2, $u_{an}$, $u_{bn}$ and $u_{on}$ are respectively three-phase voltages output by the T-type three-level three-phase grip-connected inverter, $e_a$, $e_b$, and $e_c$ are respectively three-phase grip voltages, $i_a$, $i_b$ and $i_c$ are respectively three-phase output currents output by the inversion side of the T-type three-level three-phase inverter, L is the filter inductance, and C is filter capacitance. The common point of the output filter capacitor C of the T-type three-level three-phase inverter is connected to the neutral point (the circulation neutral line) of the DC bus capacitor.

The above-mentioned T-type three-level three-phase inverter adopts SPWM modulation. In order to increase the utilization of the DC bus voltage, a third harmonic is generally added to the conventional sine-wave pulse width modulation (SPWM). After adding the third harmonic, the modulation signals of the inverter are:

$$\begin{cases} V_{aref}^* = V_{aref} + V_{offset} \\ V_{bref}^* = V_{bref} + V_{offset} \\ V_{cref}^* = V_{cref} + V_{offset} \end{cases} \quad (1)$$

wherein, $V_{aref}$, $V_{bref}$ and $V_{cref}$ are respectively three-phase conventional sine-wave pulse modulation signals, $V_{offset}$ is a third-harmonic bias signal of the three-phase conventional sine-wave pulse modulation signals, and the third-harmonic bias signal $V_{offset}$ is expressed as:

$$V_{offset\_LC} = -(\max(V_{aref}, V_{bref}, V_{cref}) + \min(V_{aref}, V_{bref}, V_{cref}))/2 \quad (2)$$

wherein, the max function takes the maximum value of the variables, and wherein, the min function takes the minimum value of the variables.

In order to suppress the LC filter resonant current from flowing in the circulation neutral line, the T-type three-level three-phase inverter generates a resonant current to offset it. First, the inversion-side current $i_a$ of the T-type three-level three-phase grid-connected inverter is passed through a low-pass filter to obtain the low-frequency current $i_{a\_low}$ of the inverter Phase-A current, which can be expressed as:

$$i_{a\_low} = \frac{\omega_f}{S + \omega_f} i_a \quad (3)$$

wherein, $\omega_f$ is a cut-off frequency of the low-pass filter, and in the present system, $\omega_f$ is selected to be $\omega_f = 314.15$ rad/s, and S is a Laplace transform operator.

Then, the high-frequency component current $i_{a\_high}$ of the three-level three-phase inversion-side current $i_a$ is:

$$i_{a\_high} = i_a - i_{a\_low} \quad (4)$$

Then, the voltage bias signal for suppressing a resonant current of the LC filter from being injected to the modulation signal is:

$$V_{offset\_LC} = K_f i_{a\_high} \tag{5}$$

wherein, $K_f$ is a conversion coefficient for converting current into voltage, in the system of the present disclosure, $K_f=4$.

Therefore, the following modulation signal having a suppression of a common-mode current of the circulation neutral line is adopted as a modulation signal for modulating the T-type three-level three-phase inverter:

$$\begin{cases} V_{aref}^* = V_{aref} + V_{offset} - V_{offset\_LC} \\ V_{bref}^* = V_{bref} + V_{offset} - V_{offset\_LC} \\ V_{cref}^* = V_{cref} + V_{offset} - V_{offset\_LC} \end{cases} \tag{6}$$

wherein, $V_{aref}^*$, $V_{bref}^*$ and $V_{cref}^*$ are respectively three-phase modulation signals for modulating the T-type three-level three-phase inverter, $V_{aref}$, $V_{bref}$ and $V_{cref}$ are respectively three-phase conventional sine-wave pulse modulation signals, $V_{offset}$ is a third-harmonic bias signal of the three-phase conventional sine-wave pulse modulation signals, and $V_{offset\_LC}$ is a voltage bias signal for suppressing a resonant current of the LC filter from being injected to the modulation signal.

Figure 3:
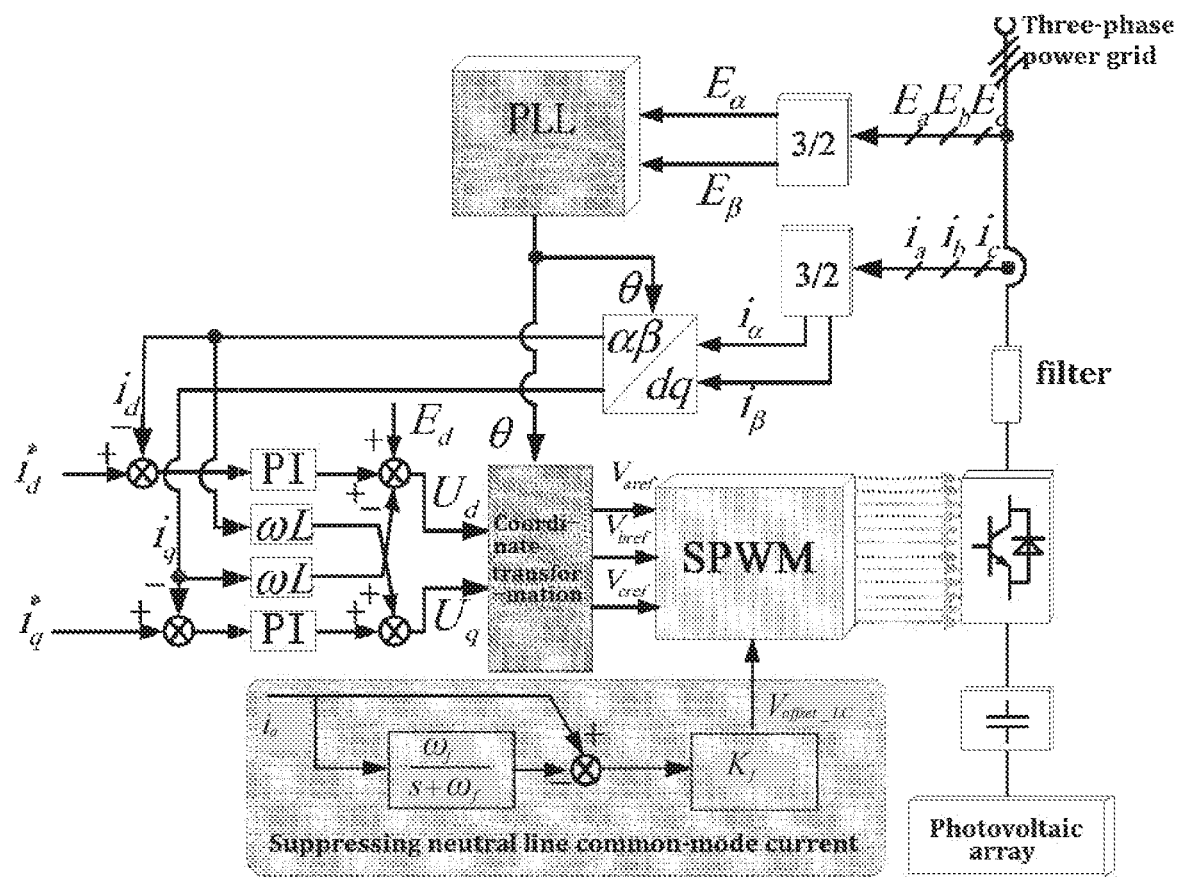
FIG. 3 is a schematic diagram of a vector control method for grid voltage orientation of a three-phase grid-connected inverter to suppress the common-mode current in a circulation neutral line.

A schematic diagram of a vector control method for grid voltage orientation of a three-phase grid-connected inverter to suppress a common-mode current of a circulation neutral line based on the above mentioned control method is shown in FIG. 3. The three-phase current signals $i_a$, $i_b$ and $i_c$ outputted by the inversion side of the T-type three-level three-phase inverter are respectively converted into corresponding DC components $i_d$ and $i_q$ in the dq coordinate system through coordinate transformation (ABC/αβ/dg transformation), and after the corresponding DC components $i_d$ and $i_q$ of the three-phase current signals are respectively compared with given values $i_d^*$ and $i_q^*$ (the given values $i_d^*$ and $i_q^*$ are freely given according to the power level, for example, in the present system, they are given as $i_d^*=20$ A, and $i_q^*=0$ A), and then adjusted outputs through a proportional-integral (PI) regulator are output. Three-phase conventional sine-wave pulse modulation signals $V_{aref}$, $V_{bref}$ and $V_{cref}$ are obtained after the adjusted outputs go through the coordinate transformation (ABC/αβ/dg transformation). In order to obtain the spatial angle of the power grid, the spatial angle of the power grid is obtained via a phase locked loop (PLL) during coordinate transformation. And in order to suppress the common-mode current of the circulation neutral line, the inversion-side current $i_a$ is filtered and converted to obtain $V_{offset\_LC}$, and then obtain the required three-phase modulation signals $V_{aref}^*$, $V_{bref}^*$ and $V_{cref}^*$.

In order to realize independent control of active power and reactive power of the T-type three-level three-phase grid-connected inverter, the T-type three-level three-phase inverter adopts a vector control mode of grid voltage orientation. The vector control mode of grid voltage orientation (Voltage Oriented Control, VOC) means that the dq synchronous rotating coordinate system is rotated synchronously with the three-phase grid voltage space vector $\vec{E}$, and the d-axis of the dq rotating coordinate system coincides with the voltage vector $\vec{E}$. A vector diagram of a vector control system based on grid voltage orientation is shown in FIG. 4.

Figure 4:
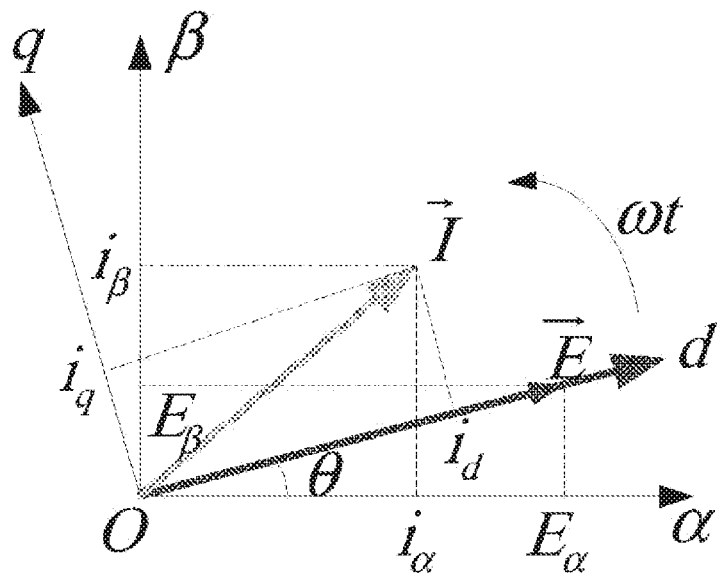
FIG. 4 is a vector diagram of a vector control system based on grid voltage orientation.

It can be seen from FIG. 4 that a component of the three-phase grid voltage vector $\vec{E}$ on the d-axis of the dq rotating coordinate system is $E_d=|\vec{E}|$, and a component on the q-axis is $E_q=0$. According to the instantaneous power theory, the instantaneous active power P and instantaneous reactive power Q output by the three-phase grid-connected inverter are respectively:

$$\begin{cases} P = E_d i_d + E_q i_q \\ Q = E_q i_d - E_d i_q \end{cases} \tag{7}$$

wherein, $E_d$ and $E_q$ are respectively the d-component and q-component of the grid voltage within the dq rotating coordinate system; and $i_d$ and $i_q$ are respectively the d-component and q-component of the three-phase grid-connected inverter output current within the dq rotating coordinate system.

Set the grid voltage on the d-axis, then $$\begin{cases} E_d = E_d \\ E_q = 0 \end{cases} \tag{8}$$

Connect Formula (7) and Formula (8) to obtain:

$$\begin{cases} P = E_d i_d \\ Q = -E_d i_q \end{cases} \tag{9}$$

From Formula (9), it can be seen that the instantaneous active power P of the system is proportional to the d-component $i_d$ of the inverter output current, while the instantaneous reactive power Q is proportional to the q-component $i_q$ of the output current. Therefore, through the control of the $i_d$ and $i_q$, the instantaneous active power and reactive power of the system can be separately controlled.

In order to verify the correctness and effectiveness of the above-mentioned method of the present disclosure, the method of the present disclosure and the conventional method were simulated and compared according to the control method of FIG. 3. System simulation parameters are shown in Table 1.

TABLE 1

| Simulation parameters | |
|---|---|
| Rated power | P = 10 kW |
| Filter inductance | L = 1.3 mH |
| Filter capacitance | C = 4.7 μF |
| BUS filter capacitance | $C_1$ = 3000 μF |
| Inverter switching frequency | $f_s$ = 20 kHz |
| DC input | $E_{dc}$ = 650 V |
| DC input resistance | $R_{dc}$ = 1 Ω |
| Power grid voltage frequency | $f_g$ = 50 Hz |
| Power grid voltage effective value | $e_{RMS}$ = 220 V |

Figure 5A:
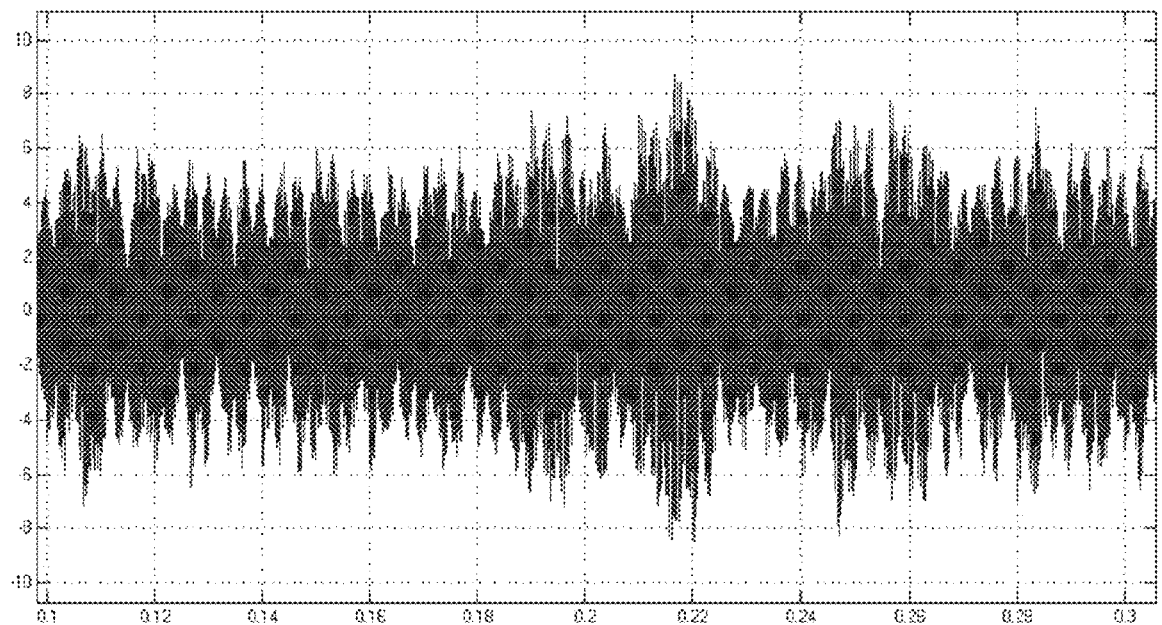
FIG. 5a is a steady-state simulation waveform diagrams of three-phase grid-connected inverters for the circulation neutral line current in a conventional method.
Figure 5B:
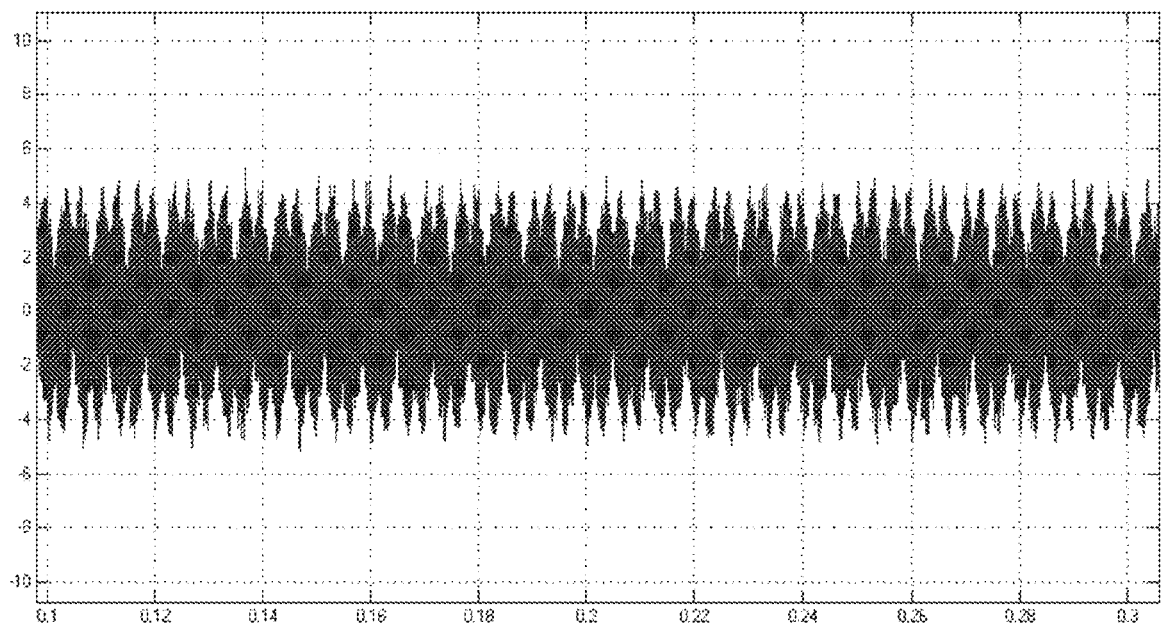
FIG. 5b is a steady-state simulation waveform diagrams of three-phase grid-connected inverters for the circulation neutral line current in the method of the present disclosure.
Figure 5C:
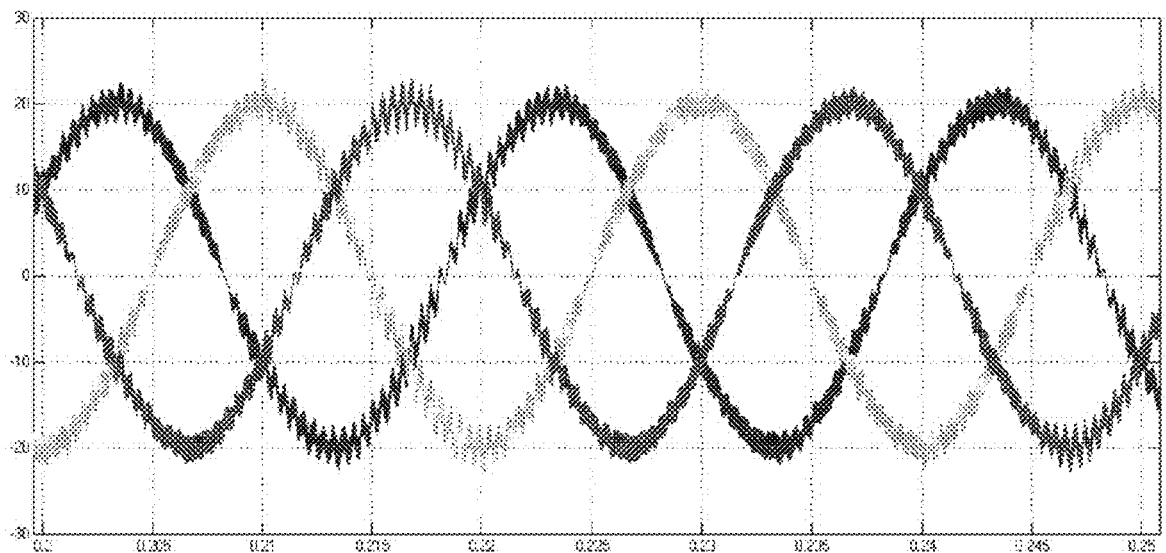
FIG. 5c is a steady-state simulation waveform diagrams of three-phase grid-connected inverters for the three-phase currents of the inversion side in a conventional method.
Figure 5D:
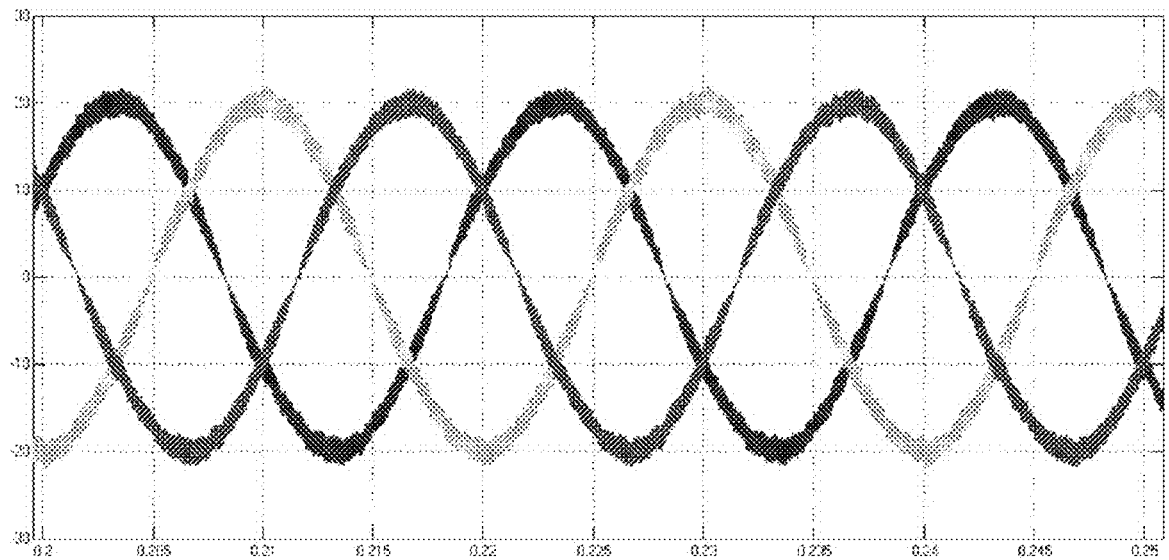
FIG. 5d is a steady-state simulation waveform diagrams of three-phase grid-connected inverters for the three-phase currents of the inversion side in the method of the present disclosure.
Figure 5E:
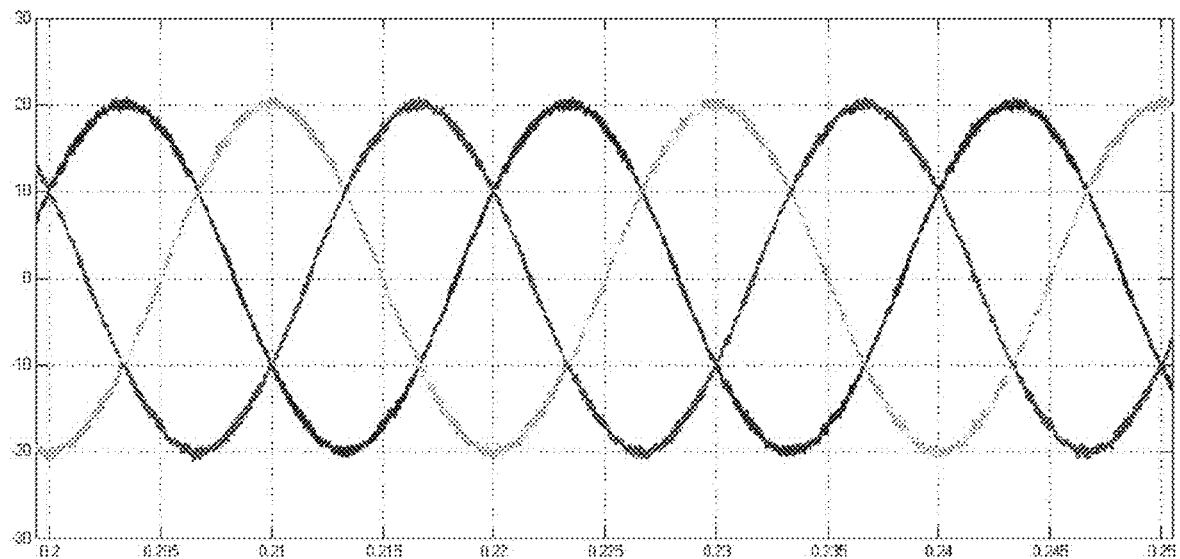
FIG. 5e is a steady-state simulation waveform diagrams of three-phase grid-connected inverters for the three-phase currents on the grid side in a conventional method.
Figure 5F:
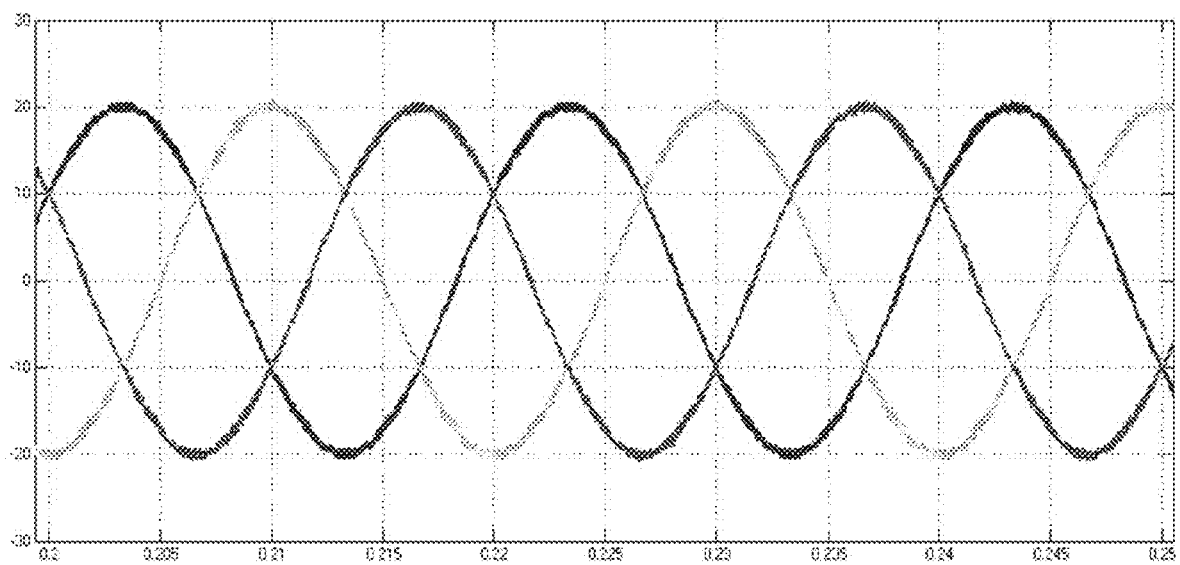
FIG. 5f is a steady-state simulation waveform diagrams of three-phase grid-connected inverters for the three-phase currents on the grid side in the method of the disclosure

In order to achieve an inversion with power factor of 1, active power current is given as $i_d^*=20$ A, reactive power current are given as $i_q^*=0$ A, and FIG. 5 shows the circulation neutral line currents, the inversion side three-phase currents and grid-side three-phase currents of the inverter outputs, wherein, FIGS. 5(a), 5(c) and 5(e) adopt the conventional method, and FIGS. 5(b), 5(d) and 5(f) adopt the method of the present disclosure. It can be seen from the simulation waveforms of FIG. 5 that: (1) the maximum value of the circulation neutral line current $i_{on}$ in the method of the present disclosure is 5 A, and the maximum value of the neutral line current $i_{on}$ in the conventional method is 9 A, and the circulation neutral line current output in the method of the present disclosure is significantly smaller than that in the conventional method; (2) the waveform quality of the inversion-side current output in the method of the present disclosure is superior to that in the conventional method, and the inversion-side current in the conventional method obviously includes the high frequency resonant current of the LC filter; (3) the grid-side currents of the inverters in the method of the present disclosure and the conventional method are basically the same. By comparing simulation waveforms in FIG. 5, it can be seen that: the method of the present disclosure can effectively suppress LC filter resonance contained in the currents of the circulation neutral line and the inversion side of the inverter, and improve the performance of the inverter, on basis of not increasing in any hardware. It has good application value in photovoltaic power generation system.

The embodiments provide a method for suppressing the resonant current of the LC filter in the T-type three-level three-phase photovoltaic grid-connected inverter and suppressing the common-mode current of the neutral line, which greatly reduces the high-frequency component of the common-mode current of the neutral line of the inverter, and is applied in the T-type three-level three-phase photovoltaic grid-connected power generation system, and improves the performance of the T-type three-level three-phase photovoltaic grid-connected inverter and the performance of the photovoltaic grid-connected power generation system.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for suppressing a common-mode current of neutral line in a T-type three-level three-phase inverter, being applied to the T-type three-level three-phase inverter adopting sine-wave pulse width modulation (SPWM) and outputting three-phase current signals $i_a$, $i_b$ and $i_c$ on an inversion side, an output of the T-type three-level three-phase inverter being connected to a power grid via an LC filter, wherein the method comprising:

adopting $$\begin{cases} V_{aref}^* = V_{aref} + V_{offset} - V_{offset\_LC} \\ V_{bref}^* = V_{bref} + V_{offset} - V_{offset\_LC} \\ V_{cref}^* = V_{cref} + V_{offset} - V_{offset\_LC} \end{cases}$$

as a modulation signal for modulating the T-type three-level three-phase inverter;
wherein, $V_{aref}^*$, $V_{bref}^*$ and $V_{cref}^*$ are respectively three-phase modulation signals for modulating the T-type three-level three-phase inverter, $V_{aref}$, $V_{bref}$ and $V_{cref}$ are respectively three-phase conventional sine-wave pulse modulation signals, $V_{offset}$ is a third-harmonic bias signal of the three-phase conventional sine-wave pulse modulation signals, $V_{offset\_LC}$ is a voltage bias signal for suppressing a resonant current of the LC filter from being injected to the modulation signal, $V_{offset\_LC} = K_f i_{a\_high}$, further wherein, $K_f$ is a conversion coefficient for converting current into voltage, and $i_{a\_high}$ is a high-frequency component of an output current $i_a$ of the inversion side of the T-type three-level three-phase inverter.

2. The method according to claim 1, wherein the output current $i_a$ of the inversion side of the T-type three-level three-phase inverter passes through a low-pass filter to obtain a high-frequency current $i_{a\_low}$, thereof, $i_{a\_high} = i_a - i_{a\_low}$.

3. The method according to claim 2, wherein $$i_{a\_low} = \frac{\omega_f}{S + \omega_f} i_a,$$

and, $\omega_f$ is a cut-off frequency of the low-pass filter, and S is a Laplace transform operator.

4. The method according to claim 1, wherein $V_{offset\_LC} = -(\max(V_{aref}, V_{bref}, V_{cref}) + \min(V_{aref}, V_{bref}, V_{cref})/2$.

5. The method for according to claim 1, further comprising converting the three-phase current signals $i_a$, $i_b$ and $i_c$ outputted by the inversion side of the T-type three-level three-phase inverter respectively into corresponding DC components $i_d$ and $i_q$ in dq coordinate system through coordinate transformation, and after comparing the corresponding DC components $i_d$ and $i_q$ of the three-phase current signals with given values $i_d^*$ and $i_q^*$ respectively, and then outputting adjusted outputs through a proportional-integral regulator, and then obtaining three-phase conventional sine-wave pulse modulation signals $V_{aref}$, $V_{bref}$ and $V_{cref}$ after the adjusted outputs finish the coordinate transformation.

6. The method according to claim 5, wherein during coordinate transformation, obtaining a spatial angle of the power grid via a phase locked loop.

7. The method according to claim 1, wherein the T-type three-level three-phase inverter adopts a vector control mode of grid voltage orientation.

* * * * *